(12) United States Patent
Bone et al.

(10) Patent No.: US 10,732,390 B2
(45) Date of Patent: Aug. 4, 2020

(54) OPTICAL LENS ASSEMBLY

(71) Applicant: Genius Electronic Optical Co., Ltd., Taichung (TW)

(72) Inventors: Matthew Bone, Fujian (CN); Feng Chen, Fujian (CN); Guo-Jin Su, Taichung (TW)

(73) Assignee: GENIUS ELECTRONIC OPTICAL (XIAMEN) CO., LTD., Xiamen, Fujian (CN)

( * ) Notice: Subject to any disclaimer, the term of this patent is extended or adjusted under 35 U.S.C. 154(b) by 149 days.

(21) Appl. No.: 15/441,240

(22) Filed: Feb. 24, 2017

(65) Prior Publication Data

US 2018/0231739 A1 Aug. 16, 2018

(30) Foreign Application Priority Data

Feb. 16, 2017 (CN) .......................... 2017 1 0082646

(51) Int. Cl.
*G02B 13/00* (2006.01)
*G02B 5/28* (2006.01)
*G02B 3/04* (2006.01)
*G02B 9/60* (2006.01)

(52) U.S. Cl.
CPC ............ *G02B 13/008* (2013.01); *G02B 3/04* (2013.01); *G02B 5/281* (2013.01); *G02B 13/0045* (2013.01); *G02B 9/60* (2013.01)

(58) Field of Classification Search
CPC .......... G02B 1/113; G02B 1/115; G02B 3/04; G02B 5/208–226; G02B 5/281; G02B 5/285–286; G02B 9/60; G02B 13/002–0045; G02B 13/0055; G02B 13/008; G02B 13/14; G02B 13/18; G02B 13/04; G02B 13/58; G02B 13/60
USPC ........ 359/355–357, 359, 581, 586, 588–590, 359/614, 714, 722–723, 770, 885, 887, 359/890, 749–753, 761, 762, 781–783
See application file for complete search history.

(56) References Cited

U.S. PATENT DOCUMENTS

| | | | |
|---|---|---|---|
| 2008/0042063 A1* | 2/2008 | Chen .......................... | G01J 5/04 250/339.01 |
| 2011/0069378 A1* | 3/2011 | Lin .......................... | G02B 5/223 359/356 |
| 2013/0057950 A1* | 3/2013 | Lin .......................... | G02B 7/022 359/356 |
| 2014/0185134 A1* | 7/2014 | Kamitakahara ........ | G02B 13/14 359/356 |

* cited by examiner

*Primary Examiner* — Stephone B Allen
*Assistant Examiner* — Adam W Booher
(74) *Attorney, Agent, or Firm* — JCIPRNET

(57) ABSTRACT

An optical lens assembly includes a plurality of lens elements, a filter, and a plurality of layer stacks. The lens elements are arranged in sequence from an object side to an image side along an optical of the optical lens assembly. Each of the lens elements includes an object-side surface and an image-side surface. At least one of the lens elements has a material capable of absorbing visible light. The filter is disposed between the lens elements and the image side and has transmittance less than 1% for light having a wavelength band greater than 1050 nm. The layer stacks are respectively stacked on the object-side surfaces and the image-side surfaces of the lens elements, so that transmittance of the optical lens assembly is greater than 95% for light having a wavelength band from 800 nm to 1000 nm.

19 Claims, 13 Drawing Sheets

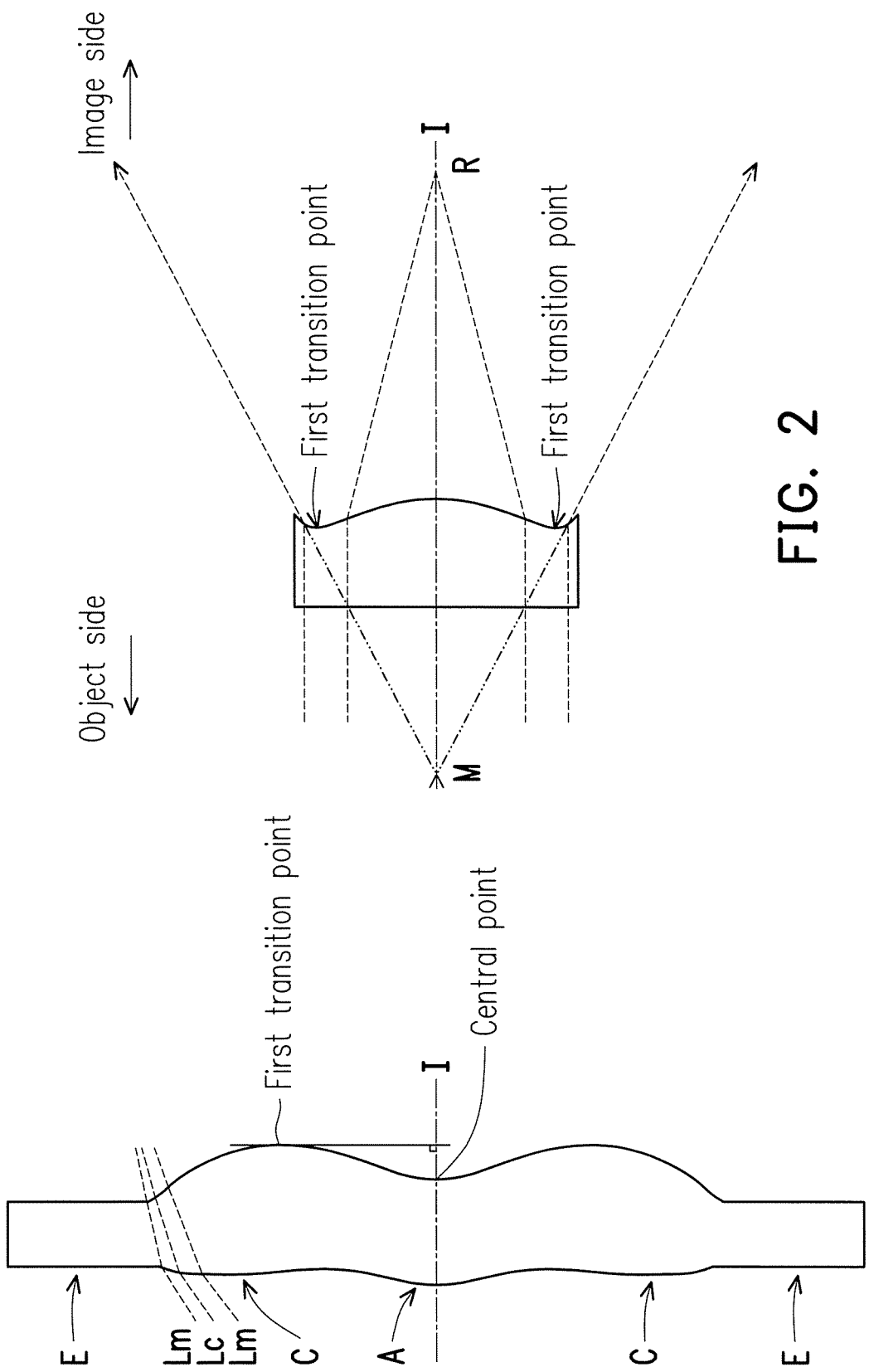

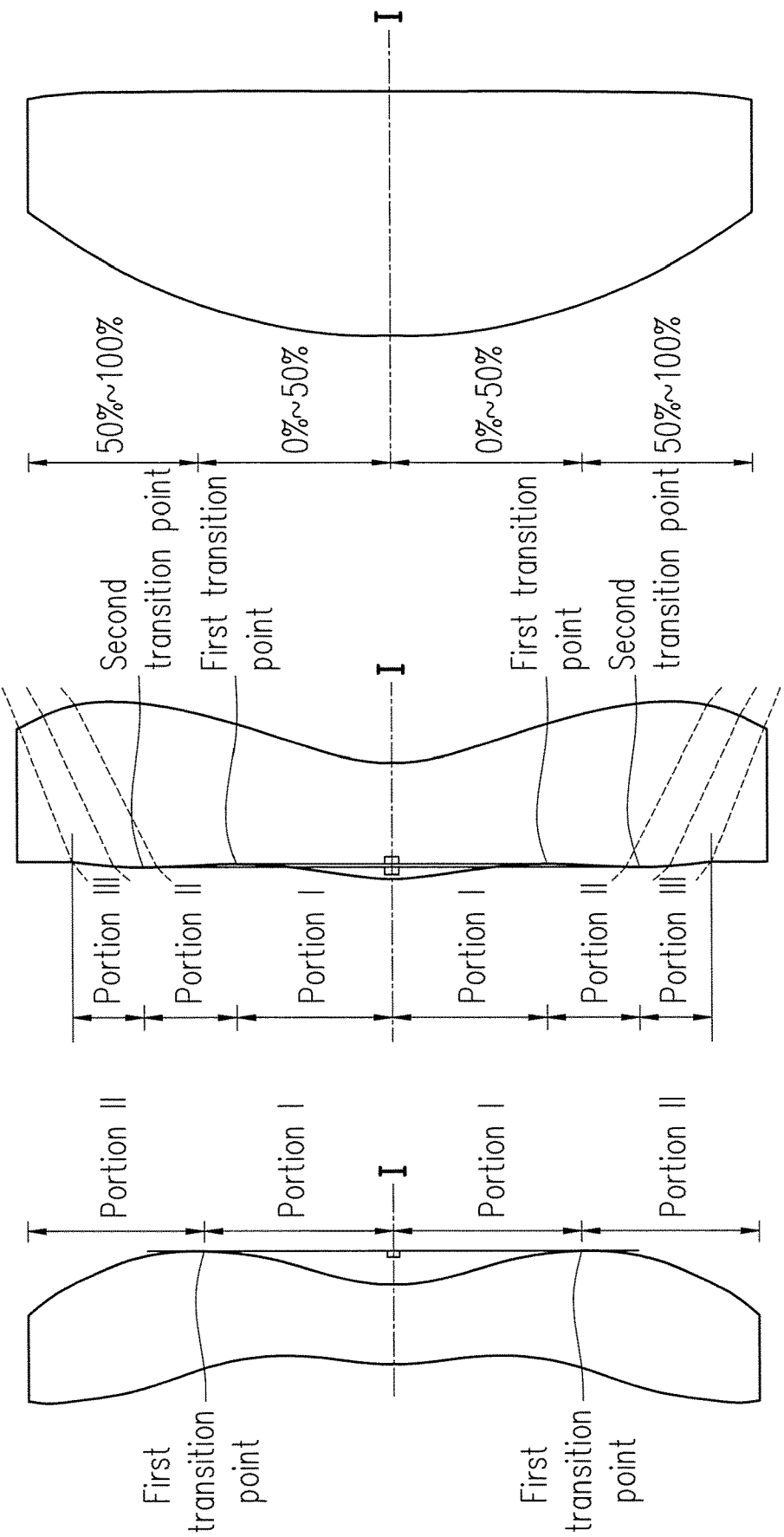

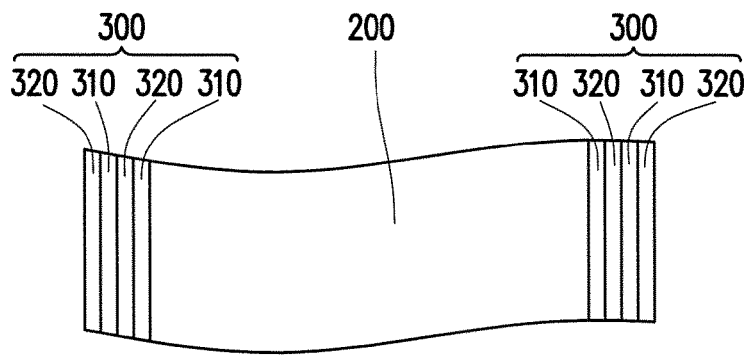
FIG. 7
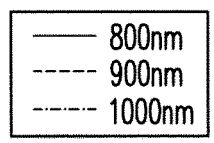
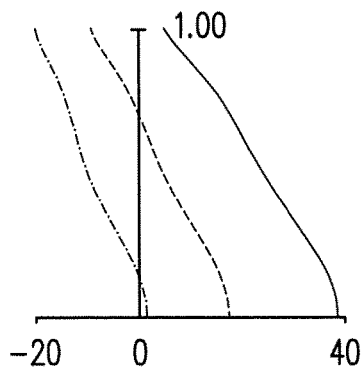
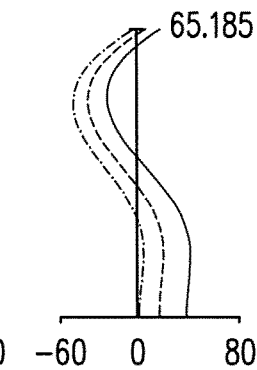
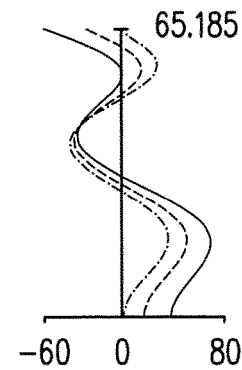
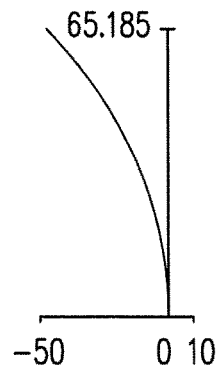
FIG. 8A   FIG. 8B   FIG. 8C   FIG. 8D Effective focal length=2.736 mm, Half field of view=65°, f-number=2.8, System length=16.124 mm

| Lens element | Surface | Radius of curvature (mm) | Thickness (mm) | Index of refraction | Abbe number | Focal length (mm) |
|---|---|---|---|---|---|---|
| Object | | Infinite | Infinite | | | |
| First lens element 3 | Object-side surface 31 | 20.205 | 0.997 | 1.582 | 30.186 | -6.322 |
| | Image-side surface 32 | 2.987 | 3.540 | | | |
| Second lens element 4 | Object-side surface 41 | -4.369 | 2.009 | 1.535 | 55.635 | 18.761 |
| | Image-side surface 42 | -3.509 | 1.898 | | | |
| Aperture stop 2 | | Infinite | 0.427 | | | |
| Third lens element 5 | Object-side surface 51 | 2.934 | 1.797 | 1.535 | 55.635 | 2.435 |
| | Image-side surface 52 | -1.795 | 0.150 | | | |
| Fourth lens element 6 | Object-side surface 61 | -1.801 | 0.489 | 1.642 | 22.409 | -1.553 |
| | Image-side surface 62 | 2.289 | 0.096 | | | |
| Fifth lens element 7 | Object-side surface 61 | 2.250 | 0.875 | 1.535 | 55.635 | 3.158 |
| | Image-side surface 62 | -5.510 | 0.500 | | | |
| Filter 9 | Object-side surface 91 | Infinite | 0.300 | 1.517 | 64.167 | |
| | Image-side surface 92 | Infinite | 3.043 | | | |
| | Image plane 100 | Infinite | | | | |

FIG. 9

| Surface | K | $a_4$ | $a_6$ | $a_8$ | $a_{10}$ |
|---|---|---|---|---|---|
| 41 | 0.000000E+00 | -6.557052E-03 | 7.207600E-05 | -6.907200E-05 | 1.110300E-05 |
| 42 | 0.000000E+00 | -2.271992E-03 | 5.139890E-04 | -3.791800E-05 | 3.947000E-06 |
| 51 | 0.000000E+00 | -4.975651E-03 | -6.290400E-04 | 6.746830E-04 | -1.266860E-04 |
| 52 | 0.000000E+00 | 8.596141E-02 | -8.833182E-03 | 6.601762E-03 | -6.839730E-04 |
| 61 | 0.000000E+00 | 7.244256E-02 | 1.886768E-02 | -5.647186E-03 | 1.137349E-03 |
| 62 | 0.000000E+00 | -1.032070E-01 | 4.108575E-02 | -9.144734E-03 | 6.772370E-04 |
| 71 | 0.000000E+00 | -6.394831E-02 | 5.810383E-03 | 1.965239E-03 | -1.000522E-03 |
| 72 | 0.000000E+00 | 4.178944E-02 | -6.595145E-03 | 4.228640E-04 | -4.676800E-05 |
| Surface | $a_{12}$ | $a_{14}$ | $a_{16}$ | | |
| 41 | 0.000000E+00 | 0.000000E+00 | 0.000000E+00 | | |
| 42 | 0.000000E+00 | 0.000000E+00 | 0.000000E+00 | | |
| 51 | 0.000000E+00 | 0.000000E+00 | 0.000000E+00 | | |
| 52 | 0.000000E+00 | 0.000000E+00 | 0.000000E+00 | | |
| 61 | 0.000000E+00 | 0.000000E+00 | 0.000000E+00 | | |
| 62 | 0.000000E+00 | 0.000000E+00 | 0.000000E+00 | | |
| 71 | 0.000000E+00 | 0.000000E+00 | 0.000000E+00 | | |
| 72 | 0.000000E+00 | 0.000000E+00 | 0.000000E+00 | | |

FIG. 10

| Lens element 3 | |
|---|---|
| TiO₂ | 40.05 nm |
| SiO₂ | 32.46 nm |
| TiO₂ | 127.78 nm |
| SiO₂ | 150.74 nm |
| Air | |

FIG. 11A

| Lens element 4 | |
|---|---|
| TiO₂ | 40.05 nm |
| SiO₂ | 32.46 nm |
| TiO₂ | 127.78 nm |
| SiO₂ | 150.74 nm |
| Air | |

FIG. 11B

| Lens element 5 | |
|---|---|
| TiO₂ | 40.05 nm |
| SiO₂ | 32.46 nm |
| TiO₂ | 127.78 nm |
| SiO₂ | 150.74 nm |
| Air | |

FIG. 11C

| Lens element 6 | |
|---|---|
| TiO₂ | 44.61 nm |
| SiO₂ | 24.92 nm |
| TiO₂ | 135.74 nm |
| SiO₂ | 153.72 nm |
| Air | |

FIG. 11D

| Lens element 7 | |
|---|---|
| TiO₂ | 40.05 nm |
| SiO₂ | 32.46 nm |
| TiO₂ | 127.78 nm |
| SiO₂ | 150.74 nm |
| Air | |

FIG. 11E

| Lens element 3 | |
|---|---|
| TiO₂ | 10.8 nm |
| SiO₂ | 42.64 nm |
| TiO₂ | 46.51 nm |
| SiO₂ | 37.55 nm |
| TiO₂ | 92.98 nm |
| SiO₂ | 164.64 nm |
| Air | |

FIG. 16A

| Lens element 4 | |
|---|---|
| TiO₂ | 10.8 nm |
| SiO₂ | 42.64 nm |
| TiO₂ | 46.51 nm |
| SiO₂ | 37.55 nm |
| TiO₂ | 92.98 nm |
| SiO₂ | 164.64 nm |
| Air | |

FIG. 16B

| Lens element 5 | |
|---|---|
| TiO₂ | 10.8 nm |
| SiO₂ | 42.64 nm |
| TiO₂ | 46.51 nm |
| SiO₂ | 37.55 nm |
| TiO₂ | 92.98 nm |
| SiO₂ | 164.64 nm |
| Air | |

FIG. 16C

| Lens element 6 | |
|---|---|
| TiO₂ | 11.4 nm |
| SiO₂ | 33.51 nm |
| TiO₂ | 52.16 nm |
| SiO₂ | 36.61 nm |
| TiO₂ | 88.11 nm |
| SiO₂ | 166.57 nm |
| Air | |

FIG. 16D

| Lens element 7 | |
|---|---|
| TiO₂ | 10.8 nm |
| SiO₂ | 42.64 nm |
| TiO₂ | 46.51 nm |
| SiO₂ | 37.55 nm |
| TiO₂ | 92.98 nm |
| SiO₂ | 164.64 nm |
| Air | |

FIG. 16E

OPTICAL LENS ASSEMBLY

CROSS-REFERENCE TO RELATED APPLICATION

This application claims the priority benefit of Chinese application serial no. 201710082646.2, filed on Feb. 16, 2017. The entirety of the above-mentioned patent application is hereby incorporated by reference herein and made a part of this specification.

BACKGROUND OF THE INVENTION

1. Field of the Invention

The invention generally relates to an optical assembly and, in particular, to an optical lens assembly.

2. Description of Related Art

In recent years, optical imaging technology is vigorously developed. The optical imaging technology may be applied in mobile phones, cameras, tablet computers, personal digital assistants, automotive video devices, surveillance cameras, virtual reality trackers, and so on. In the optical imaging technology, an optical lens assembly is a key element to form an image on the image plane, and mainly determines the image quality of the formed image.

With the trend of the electronic device towards a reduced size, the optical lens assembly is also needed to be reduced. However, to prevent reduction in photographic effects and quality, when the length of the optical lens assembly is reduced, good optical performance still needs to be achieved.

In addition to a general optical lens assembly for forming visible light images, an infrared optical lens assembly is also widely used. For example, the surveillance cameras or automotive video cameras need to take infrared images in an environment of insufficient lighting. Moreover, a biometric device, e.g. an iris recognition device, generally needs an infrared lens to take an infrared image.

However, a general optical lens assembly for near infrared adopts a filter for blocking stray light, but such a design can not effectively increase the transmittance of the optical lens assembly for a near infrared band.

SUMMARY OF THE INVENTION

Accordingly, the invention is directed to an optical lens assembly having high transmittance for near infrared.

According to an embodiment of the invention, an optical lens assembly including a plurality of lens elements, a filter, and a plurality of layer stacks is provided. The lens elements are arranged in sequence from an object side to an image side along an optical of the optical lens assembly. Each of the lens elements includes an object-side surface facing the object side and allowing imaging rays to pass through and an image-side surface facing the image side and allowing the imaging rays to pass through. At least one of the lens elements has a material capable of absorbing visible light and has transmittance being less than 2% for visible light. The filter is disposed between the lens elements and the image side and has transmittance less than 1% for light having a wavelength band greater than 1050 nm. The layer stacks are respectively stacked on the object-side surfaces and the image-side surfaces of the lens elements. Each of the layer stacks includes at least one high index material layer and at least one low index material layer stacked together so that transmittance of the optical lens assembly is greater than 95% for light having a wavelength band from 800 nm to 1000 nm. An index of refraction of the high index material layer is greater than an index of refraction of the low index material layer.

Since the optical lens assembly according to the embodiment of the invention has a plurality of layer stacks respectively stacked on the object-side surfaces and the image-side surfaces of the lens elements, and since each of the layer stacks includes at least one high index material layer and at least one low index material layer stacked together, the optical lens assembly may have high transmittance for near infrared.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic describing the surface structure of a lens element.

FIG. 2 is a schematic describing the surface concave and convex structure and the ray focus of a lens element.

FIG. 3 is a schematic describing the surface structure of the lens element of example 1.

FIG. 4 is a schematic describing the surface structure of the lens element of example 2.

FIG. 5 is a schematic describing the surface structure of the lens element of example 3.

FIG. 7 is a schematic local cross-sectional view of the layer stacks and the lens element in FIG. 6.

FIG. 8A to FIG. 8D are diagrams of the longitudinal spherical aberration and various aberrations of the optical lens assembly in FIG. 6.

FIG. 9 shows detailed optical data of the optical lens assembly in FIG. 6.

FIG. 10 shows aspheric surface parameters of the optical lens assembly in FIG. 6.

FIG. 11A to FIG. 11E show the arrangement and thickness of the high index material layers and the low index material layers on the lens elements in the embodiment of FIG. 7.

FIG. 16A to FIG. 16E show the arrangement and thickness of the high index material layers and the low index material layers on the lens elements in the embodiment of FIG. 15.

DESCRIPTION OF THE EMBODIMENTS

Figure 6:
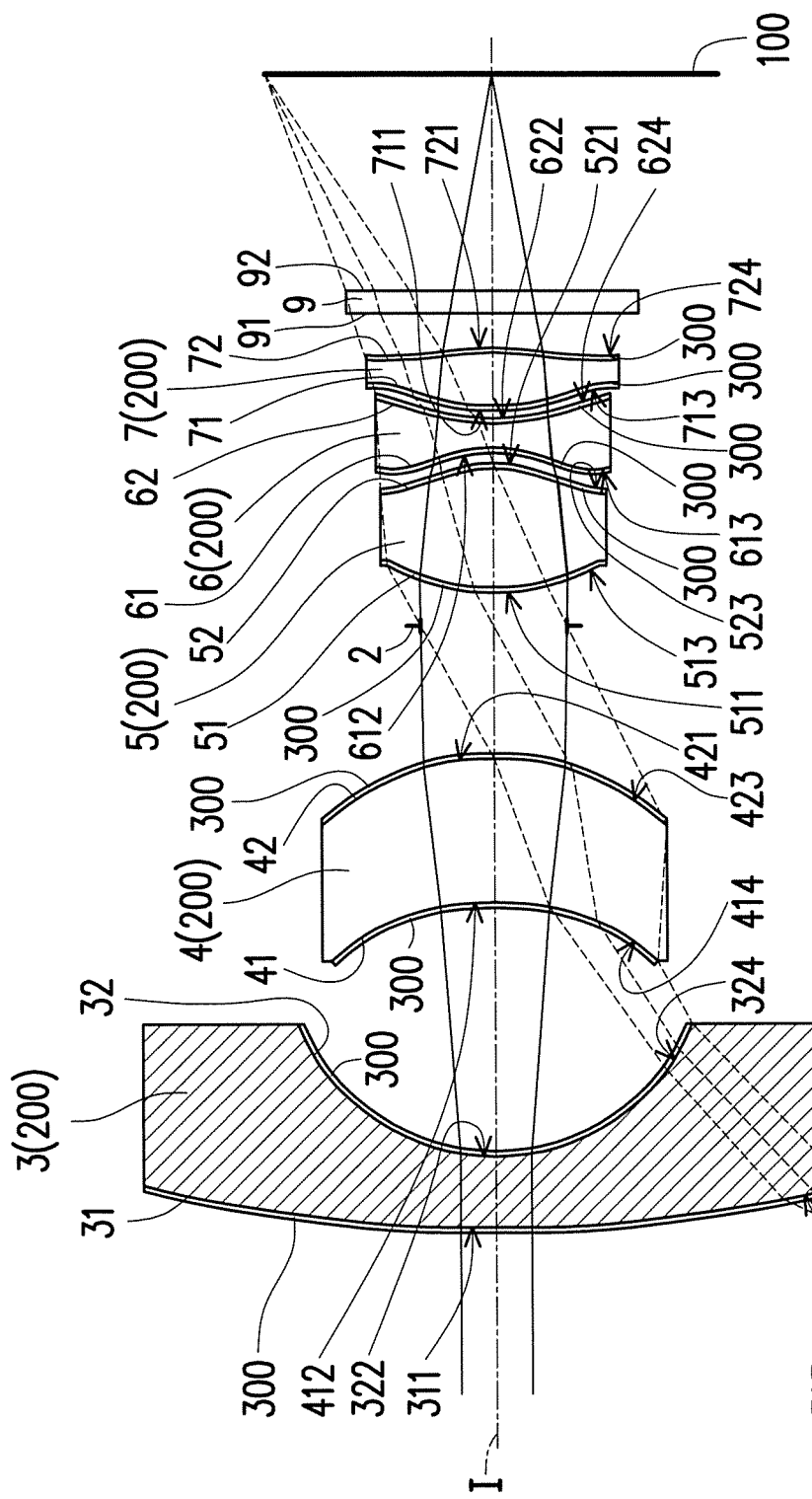
FIG. 6 is a schematic cross-sectional view of an optical lens assembly according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens element surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic cross-sectional view of an optical lens assembly according to an embodiment of the invention, and FIG. 7 is a schematic local cross-sectional view of the layer stacks and the lens element in FIG. 6. Referring to FIG. 6 and FIG. 7, the optical lens assembly 10 in this embodiment includes a plurality of lens elements 200 (for example, the lens elements 3, 4, 5, 6, and 7 as shown in FIG. 6), a filter 9, and a plurality of layer stacks 300 is provided. The lens elements 3, 4, 5, 6, and 7 are arranged in sequence from an object side to an image side along an optical axis I of the optical lens assembly 10. When rays emitted by an object to be photographed enter the optical lens assembly 10 and pass through the lens elements 3 and 4, an aperture stop 2, the lens elements 5, 6, and 7, and the filter 9 in sequence, an image is formed on an image plane 100. The object side is a side facing the object to be photographed and the image side is a side facing the image plane 100.

Each of the lens elements 3, 4, 5, 6, and 7 and the filter 9 includes an object-side surface 31, 41, 51, 61, 71, 91 facing the object side and allowing imaging rays to pass through and an image-side surface 32, 42, 52, 62, 72, 92 facing the image side and allowing the imaging rays to pass through. At least one of the lens elements 200 has a material capable of absorbing visible light and has transmittance being less than 2% for visible light. In this embodiment, the lens element 3 closet to the object side among the lens elements 200 is made of a material capable of absorbing visible light and has transmittance being less than 2% for visible light. The filter 9 is disposed between the lens elements 200 and the image side and has transmittance less than 1% for light having a wavelength band greater than 1050 nm. In an embodiment, the filter 9 has transmittance less than 1% for light having a wavelength band greater than 1050 nm and less than 2000 nm.

The layer stacks 300 are respectively stacked on the object-side surfaces 31, 41, 51, 61, and 71 and the image-side surfaces 32, 42, 52, 62, and 72 of the lens elements 3, 4, 5, 6, and 7. Each of the layer stacks 300 includes at least one high index material layer 310 and at least one low index material layer 320 stacked together so that transmittance of the optical lens assembly 10 is greater than 95% for light having a wavelength band from 800 nm to 1000 nm due to thin-film interference. The index of refraction of the high index material layer 310 is greater than the index of refraction of the low index material layer 320.

In this embodiment, each of the layer stacks 300 includes two high index material layers 310 and two low index material layers 320 stacked alternately. Moreover, in this embodiment, for each of the layer stacks 300, a high index material layer 310 closest to a corresponding lens element 200 among the high index material layers 310 is disposed between the corresponding lens element 200 and a low index material layer 320 closest to the corresponding lens element 200 among the low index material layers 320. That is, the high index material layer 310, the low index material layer 320, the high index material layer 310, and the low index material layer 320 are stacked in sequence from the corresponding lens element 200 to air. In this embodiment, the high index material layers 310 are made of titanium dioxide, and the low index material layers are made of silicon dioxide. In this embodiment, the index of refraction of the high index material layers 310 ranges from 2.4 to 2.7, and the index of refraction of the low index material layers 320 ranges from 1.5 to 1.6.

In this embodiment, for each of the layer stacks 300, the index of refraction of the high index material layers 310 is greater than the index of refraction of the corresponding lens element 200. In this embodiment, the lens elements 3, 4, 5, 6, and 7 are made of plastic material, and the material of the filter 9 includes glass. For example, the lens element 3 is made of the material of TEIJIN L-1225L, the lens element 4, 5, and 7 are made of the material having the code of ZEONEX-F52R in the conventional optical design software Zemax, and the lens element 6 is made of the material having the code of OKP1-14 in the conventional optical design software Zemax. Moreover, the substrate of the filter 9 is made of the material having the code of BK7 in the conventional optical design software Zemax.

In this embodiment, the first lens element 3 has negative refracting power. The object-side surface 31 of the first lens element 3 is a convex surface and has a convex portion 311 in a vicinity of the optical axis I and a convex portion 313 in a vicinity of a periphery of the first lens element 3. The image-side surface 32 of the first lens element 3 is a concave surface and has a concave portion 322 in a vicinity of the optical axis I and a concave portion 324 in a vicinity of the periphery of the first lens element 3.

The second lens element 4 has positive refracting power. The object-side surface 41 of the second lens element 4 is a concave surface and has a concave portion 412 in a vicinity of the optical axis I and a concave portion 414 in a vicinity of a periphery of the second lens element 4. The image-side surface 42 of the second lens element 4 is a convex surface and has a convex portion 421 in a vicinity of the optical axis I and a convex portion 423 in a vicinity of a periphery of the second lens element 4.

The third lens element 5 has positive refracting power. The object-side surface 51 of the third lens element 5 is a convex surface and has a convex portion 511 in a vicinity of the optical axis I and a convex portion 513 in a vicinity of a periphery of the third lens element 5. The image-side surface 52 of the third lens element 5 is a convex surface and has a convex portion 521 in a vicinity of the optical axis I and a convex portion 523 in a vicinity of the periphery of the third lens element 5.

The fourth lens element 6 has negative refracting power. The object-side surface 61 of the fourth lens element 6 has a concave portion 612 in a vicinity of the optical axis I and a convex portion 613 in a vicinity of a periphery of the fourth lens element 6. The image-side surface 62 of the fourth lens element 6 is a concave surface and has a concave portion 622 in a vicinity of the optical axis I and a concave portion 624 in a vicinity of the periphery of the fourth lens element 6.

The fifth lens element 7 has positive refracting power. The object-side surface 71 of the fifth lens element 7 is a convex surface and has a convex portion 711 in a vicinity of the optical axis I and a convex portion 713 in a vicinity of a periphery of the fifth lens element 7. The image-side surface 72 of the fifth lens element 7 has a convex portion 721 in a vicinity of a periphery of the optical axis I and a concave portion 724 in a vicinity of a periphery of the fifth lens element 7.

The other detailed optical data of this embodiment is as shown in FIG. 9, and in this embodiment, the effective focal length (EFL) of the whole optical lens assembly 10 is 2.736 mm, the half field of view (HFOV) thereof is 65°, the f-number (Fno) thereof is 2.8, and the system length thereof is 16.124 mm. In particular, the system length refers to the distance from the object-side surface 31 of the first lens element 3 to the image plane 100 on the optical axis I.

Moreover, in the present embodiment, the object-side surface 31 and the image-side surface 32 of the first lens element 3 are spherical surfaces, while the object-side surfaces 41, 51, 61, and 71 and the image-side surfaces 42, 52, 62, and 72 of the second lens element 4, the third lens element 5, the fourth lens element 6, and the fifth lens element 7 are all aspheric surfaces, and the aspheric surfaces are defined according to the following general formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (1)$$

wherein:

Y: distance between a point on the aspheric surface curve and the optical axis I;

Z: depth (perpendicular distance between the point on the aspheric surface that is spaced by the distance Y from the optical axis I and a tangent plane tangent to the vertex of the aspheric surface on the optical axis I) of the aspheric surface;

R: radius of curvature of the lens element surface in a vicinity of the optical axis I;

K: conic constant;

$a_i$: i-th aspheric surface coefficient.

Each of the aspheric coefficients of the object-side surfaces 41, 51, 61, and 71 and the image-side surfaces 42, 52, 62, and 72 in general formula (1) is as shown in FIG. 10. In particular, the rows corresponding to the surface number 41 in FIG. 10 represent the aspheric coefficients of the object-side surface 41 of the second lens element 4, and the other row fields are defined in a similar manner.

Referring further to FIG. 8A to FIG. 8D, FIG. 8A describes longitudinal spherical aberration of this embodiment when the pupil radius thereof is 0.4885 mm, FIG. 8B and FIG. 8C respectively describe the field curvature in the sagittal direction and the field curvature in the tangential direction on the image plane 100 of this embodiment when the wavelengths thereof are 800 nm, 900 nm, and 1000 nm, and FIG. 8D describes the distortion aberration on the image plane 100 of this embodiment when the wavelengths thereof are 800 nm, 900 nm, and 1000 nm. In the longitudinal spherical aberration figure of FIG. 8A of the first embodiment, the curves formed by various wavelengths are all very close and are in a vicinity of the center, indicating the off-axis rays at different heights of each wavelength are all concentrated in a vicinity of the imaging point, and it can be seen from the deflection amplitude of the curve of each wavelength that, the imaging point deviation of the off-axis rays at different heights is controlled within the range of ±40 microns, and therefore in the present embodiment, the spherical aberration of the same wavelength is indeed significantly improved. Moreover, the distances between the three representative wavelengths are also relative close, indicating the imaging positions of different wavelength rays are relatively concentrated, and therefore the chromatic aberration is also significantly improved.

In the two field curvature figures of FIG. 8B and FIG. 8C, the focal length variation amount of three representative wavelengths in the entire field of view is within ±70 microns, indicating that the optical system of this embodiment can effectively eliminate aberrations. The distortion aberration figure of FIG. 8D shows the distortion aberration of this embodiment is maintained within the range of ±48%, indicating the distortion aberration of this embodiment satisfies the imaging quality requirements of the optical system, and as a result, in comparison to the current optical lens, in this embodiment, under the condition that the system length is reduced to about 16.124 mm, good imaging quality can still be provided. Therefore, in this embodiment, under the condition of maintaining good optical performance, the lens length can be reduced and the shooting angle can be expanded to achieve a product design that is thinner and has increased field of view.

In regard to the optical lens assembly 10 in this embodiment, since the optical lens assembly 10 has a plurality of layer stacks 300 respectively stacked on the object-side surfaces 31, 41, 51, 61, and 71 and the image-side surfaces 32, 42, 52, 62, and 72 of the lens elements 200, and since each of the layer stacks 300 includes at least one high index material layer 310 and at least one low index material layer 320 stacked together, the optical lens assembly 10 may have high transmittance for near infrared. For example, the optical lens assembly 10 may achieve that the transmittance of the optical lens assembly 10 is greater than 95% for light having a wavelength band from 800 nm to 1000 nm. Therefore, the optical lens assembly 10 may be a night vision lens or an infrared lens having high performance.

FIG. 11A to FIG. 11E show the arrangement and thickness of the high index material layers 310 and the low index material layers 320 on the lens elements 3, 4, 5, 6, and 7 in the embodiment of FIG. 7. Referring to FIG. 11A to FIG. 11E, FIG. 11A means that the $TiO_2$ layer having thickness of 40.05 nm, the $SiO_2$ layer having thickness of 32.46 nm, the $TiO_2$ layer having thickness of 127.78 nm, and the $SiO_2$ layer having thickness of 150.74 nm are stacked on both the object-side surface 31 and the image-side surface 32 of the lens element 3 from the lens element 3 to air, and FIG. 11B to FIG. 11E show the arrangement and thickness of the high index material layers 310 and the low index material layers 320 on the lens elements 4, 5, 6, and 7 in a similar way.

Figure 12A:
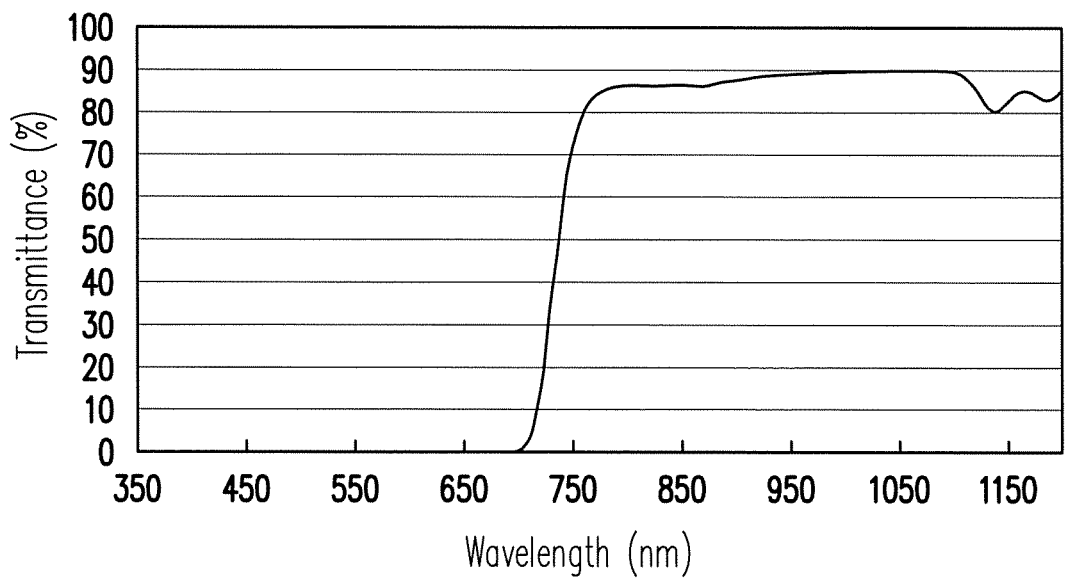
FIG. 12A shows the transmittance spectrum of the lens element 3 without the layer stacks 300 stacked thereon.
Figure 12B:
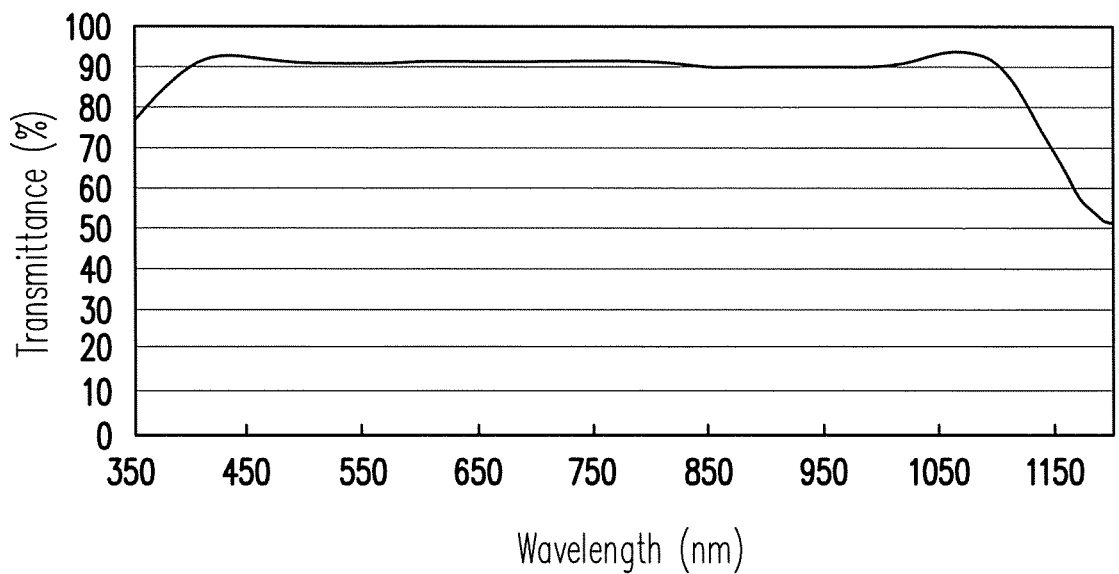
FIG. 12B shows the transmittance spectrum of the lens element 4, 5, and 7 without the layer stacks 300 stacked thereon.
Figure 12C:
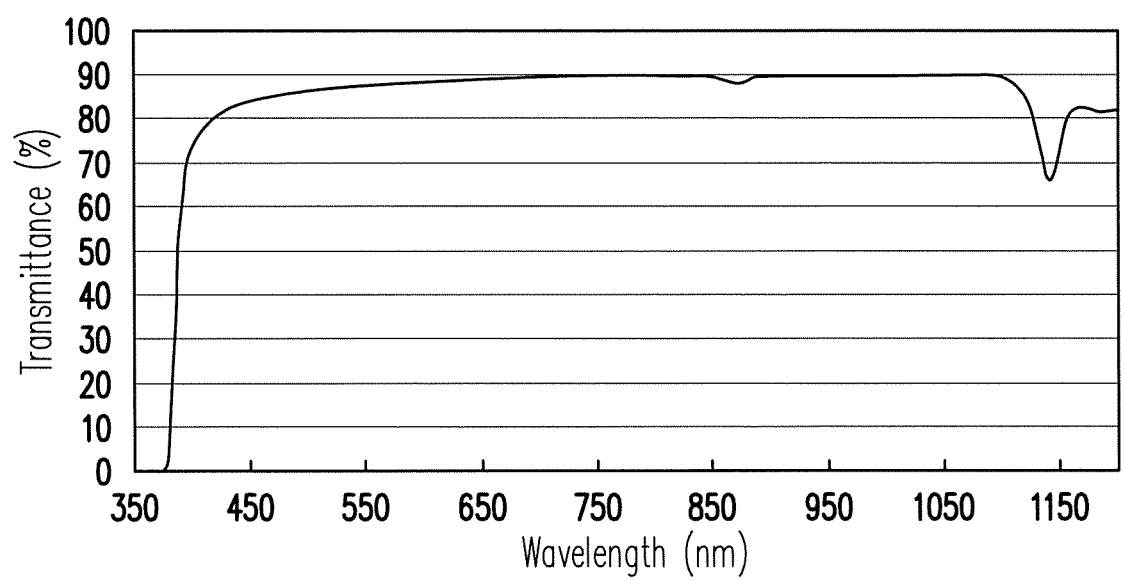
FIG. 12C shows the transmittance spectrum of the lens element 6 without the layer stacks 300 stacked thereon.
Figure 13A:
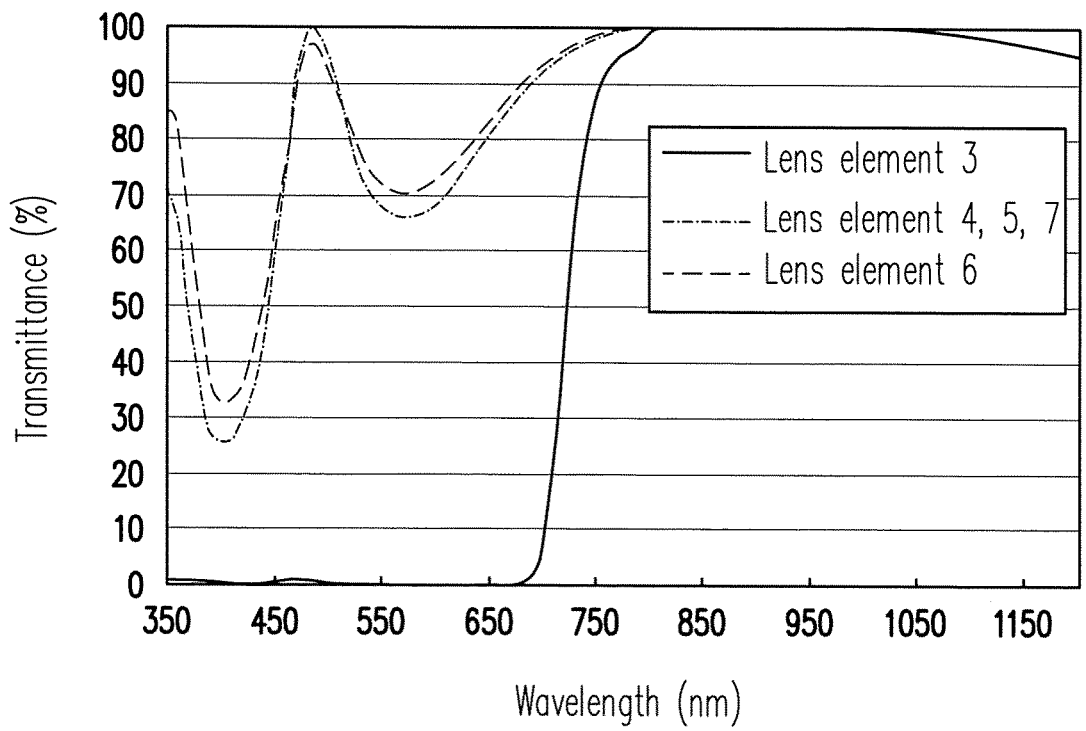
FIG. 13A shows the transmittance spectra of the lens elements in FIG. 6 with the layer stacks in FIG. 7.
Figure 13B:
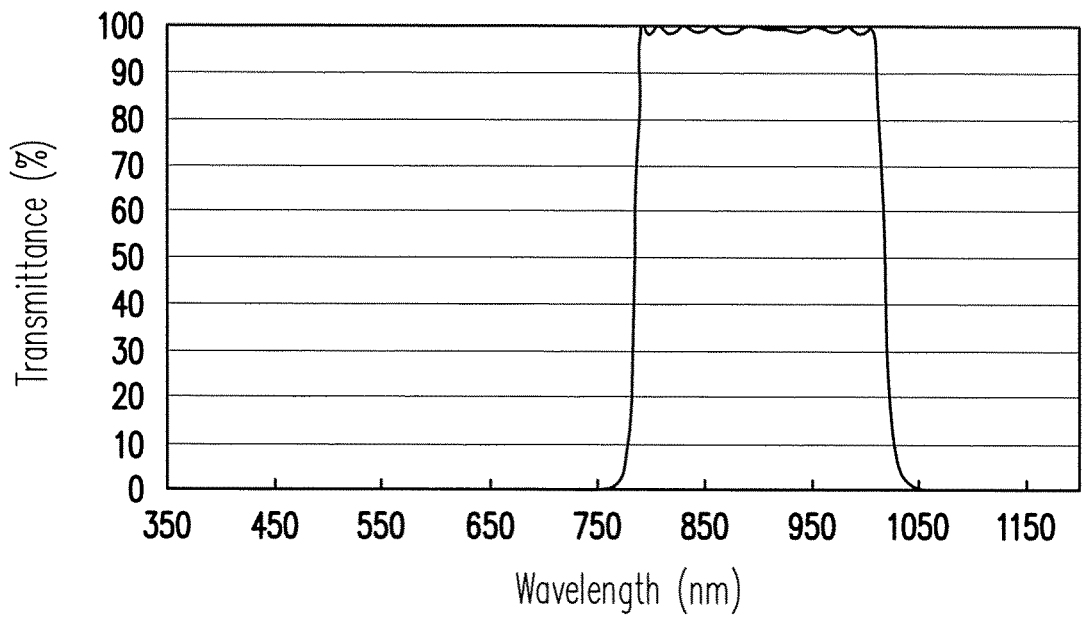
FIG. 13B shows the transmittance spectrum of the filter in FIG. 6.
Figure 14:
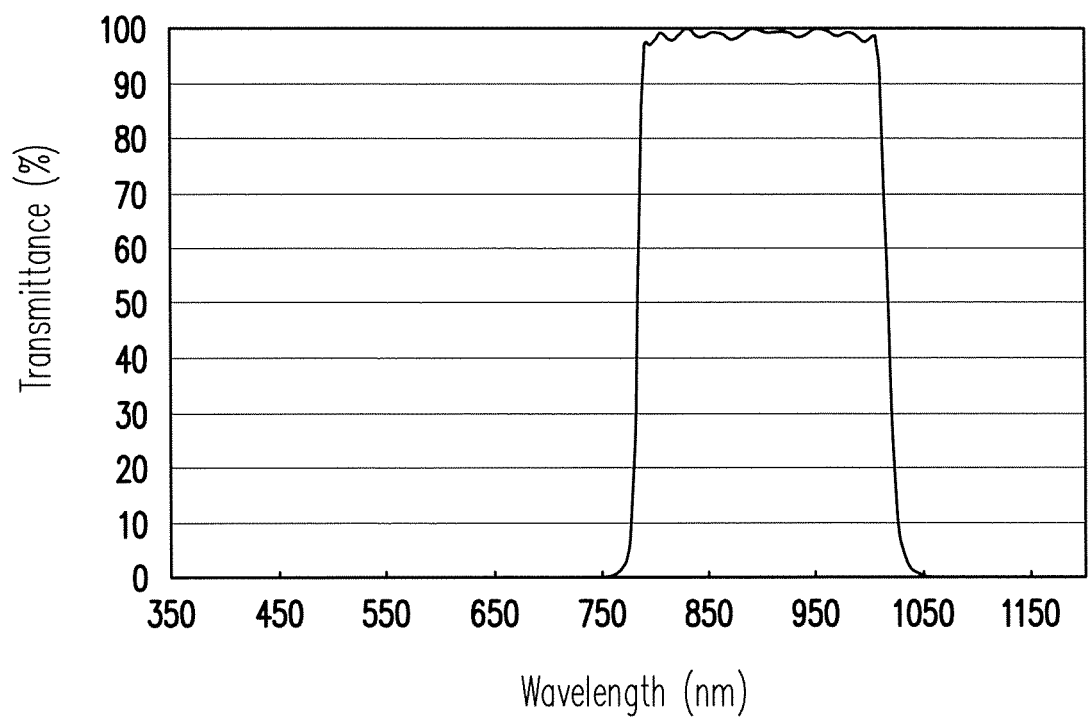
FIG. 14 shows the transmittance spectrum of the whole optical lens assembly in FIG. 6 having the layer stacks in FIG. 7.

FIG. 12A shows the transmittance spectrum of the lens element 3 without the layer stacks 300 stacked thereon, FIG. 12B shows the transmittance spectrum of the lens element 4, 5, and 7 without the layer stacks 300 stacked thereon, and FIG. 12C shows the transmittance spectrum of the lens element 6 without the layer stacks 300 stacked thereon. From FIG. 12A to FIG. 12C, it can be learned that the transmittance of each of the lens elements 3, 4, 5, 6, and 7 is less than 92% for light having a wavelength band from 800 nm to 1000 nm. FIG. 13A shows the transmittance spectra of the lens elements 3, 4, 5, 6, and 7 in FIG. 6 with the layer stacks 300 in FIG. 7, FIG. 13B shows the transmittance spectrum of the filter 9 in FIG. 6, and FIG. 14 shows the transmittance spectrum of the whole optical lens assembly 10 in FIG. 6 having the layer stacks 300 in FIG. 7. From FIG. 13A and FIG. 13B, it can be learned that with the layer stacks 300 stacked on the lens elements 3, 4, 5, 6, and 7, the transmittance for light having a wavelength band from 800 nm to 1000 nm is effectively increased and greater than 95% due to thin-film interference. Moreover, from FIG. 14, it can be learned that the transmittance of the whole optical lens assembly 10 in FIG. 6 having the layer stacks 300 in FIG. 7 is improved to being greater than 95%.

Figure 15:
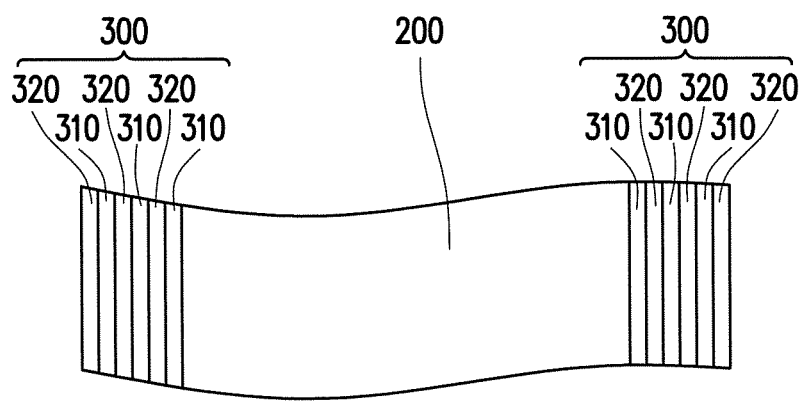
FIG. 15 is a schematic local cross-sectional view of the layer stacks and the lens element in an optical lens assembly according to another embodiment of the invention.

FIG. 15 is a schematic local cross-sectional view of the layer stacks and the lens element in an optical lens assembly according to another embodiment of the invention. Referring to FIG. 6 and FIG. 15, the optical lens assembly in this embodiment is similar to the optical lens assembly 10 in FIG. 6 and FIG. 7, and the difference therebetween is as follows. In this embodiment as shown in FIG. 15, each of the layer stacks 300 includes three high index material layers 310 and three low index material layers 320 stacked alternately. Moreover, in this embodiment, for each of the layer stacks 300, a high index material layer 310 closest to a corresponding lens element 200 among the high index material layers 310 is disposed between the corresponding lens element 200 and a low index material layer 320 closest to the corresponding lens element 200 among the low index material layers 320. That is, the high index material layer 310, the low index material layer 320, the high index material layer 310, the low index material layer 320, the high index material layer 310, and the low index material layer 320 are stacked in sequence from the corresponding lens element 200 to air.

FIG. 16A to FIG. 16E show the arrangement and thickness of the high index material layers 310 and the low index material layers 320 on the lens elements 3, 4, 5, 6, and 7 in the embodiment of FIG. 15. Referring to FIG. 16A to FIG. 16E, FIG. 16A means that the TiO$_2$ layer having thickness of 10.8 nm, the SiO$_2$ layer having thickness of 42.64 nm, the TiO$_2$ layer having thickness of 46.51 nm, the SiO$_2$ layer having thickness of 37.55 nm, the TiO$_2$ layer having thickness of 92.98 nm, and the SiO$_2$ layer having thickness of 164.64 nm are stacked on both the object-side surface 31 and the image-side surface 32 of the lens element 3 from the lens element 3 to air, and FIG. 16B to FIG. 16E show the arrangement and thickness of the high index material layers 310 and the low index material layers 320 on the lens elements 4, 5, 6, and 7 in a similar way.

Figure 17:
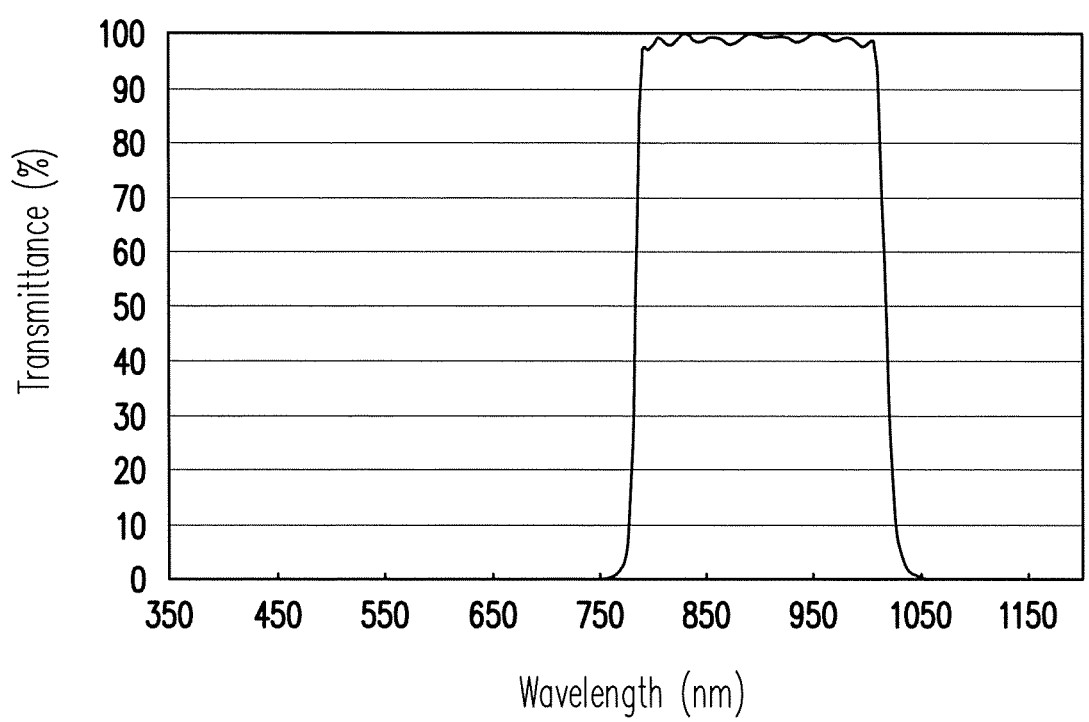
FIG. 17 shows the transmittance spectrum of the whole optical lens assembly in the embodiment of FIG. 15 having the layer stacks in FIG. 15.

FIG. 17 shows the transmittance spectrum of the whole optical lens assembly 10 in the embodiment of FIG. 15 having the layer stacks 300 in FIG. 15. From FIG. 17, it can be learned that the transmittance of the whole optical lens assembly in the embodiment of FIG. 15 having the layer stacks 300 in FIG. 15 is improved to being greater than 95%.

The optical lens assembly 10 in embodiments of the invention is not limited to having five lens elements 200, and the shapes of the lens elements 200 are not limited to those shown in FIG. 6. In other embodiments, the number of the lens elements 200 may be any positive integer other than five. Moreover, in other embodiments, the shapes of the lens elements 200 may be other shapes.

In conclusion, since the optical lens assembly according to the embodiment of the invention has a plurality of layer stacks respectively stacked on the object-side surfaces and the image-side surfaces of the lens elements, and since each of the layer stacks includes at least one high index material layer and at least one low index material layer stacked together, the optical lens assembly may have high transmittance for near infrared due to thin-film interference.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical lens assembly comprising
a plurality of lens elements arranged in sequence from an object side to an image side along an optical axis of the optical lens assembly, each of the lens elements comprising an object-side surface facing the object side and allowing imaging rays to pass through and an image-side surface facing the image side and allowing the imaging rays to pass through, at least one of the lens elements having a material capable of absorbing visible light and having transmittance being less than 2% for visible light, wherein a lens element closest to the object side among all the lens elements of the optical lens assembly is made of a material capable of absorbing visible light and has negative refracting power,
wherein no additional lens element other than the plurality of lens elements is provided between the plurality of lens elements and the object;
a filter disposed between the lens elements and the image side and having transmittance less than 1% for light having a wavelength band greater than 1050 nm; and
a plurality of layer stacks respectively stacked on the object-side surfaces and the image-side surfaces of the lens elements, each of the layer stacks comprising at least one high index material layer and at least one low index material layer stacked together so that for light having a wavelength band from 800 nm to 1000 nm, transmittance of the light passing through the optical lens assembly is greater than 95% throughout the entire wavelength band from 800 nm to 1000 nm, wherein an index of refraction of the high index material layer is greater than an index of refraction of the low index material layer.

2. The optical lens assembly according to claim 1, wherein each of the layer stacks comprises two high index material layers and two low index material layers stacked alternately.

3. The optical lens assembly according to claim 2, wherein for each of the layer stacks, a high index material layer closest to a corresponding lens element among the high index material layers is disposed between the corresponding lens element and a low index material layer closest to the corresponding lens element among the low index material layers.

4. The optical lens assembly according to claim 3, wherein for each of the layer stacks, the index of refraction of the high index material layers is greater than the index of refraction of the corresponding lens element.

5. The optical lens assembly according to claim 2, wherein the high index material layers are made of titanium dioxide, and the low index material layers are made of silicon dioxide.

6. The optical lens assembly according to claim 1, wherein each of the layer stacks comprises three high index material layers and three low index material layers stacked alternately.

7. The optical lens assembly according to claim 6, wherein for each of the layer stacks, a high index material layer closest to a corresponding lens element among the high index material layers is disposed between the corresponding lens element and a low index material layer closest to the corresponding lens element among the low index material layers.

8. The optical lens assembly according to claim 7, wherein for each of the layer stacks, the index of refraction of the high index material layers is greater than the index of refraction of the corresponding lens element.

9. The optical lens assembly according to claim 6, wherein the high index material layers are made of titanium dioxide, and the low index material layers are made of silicon dioxide.

10. The optical lens assembly according to claim 1, wherein the at least one high index material layer is made of titanium dioxide, and the at least one low index material layer is made of silicon dioxide.

11. The optical lens assembly according to claim 1, wherein an index of refraction of the at least one high index material layer ranges from 2.4 to 2.7, and an index of refraction of the at least one low index material layer ranges from 1.5 to 1.6.

12. An optical lens assembly comprising:
a plurality of lens elements arranged in sequence from an object side to an image side along an optical axis of the optical lens assembly, each of the lens elements comprising an object-side surface facing the object side and allowing imaging rays to pass through and an image-side surface facing the image side and allowing the imaging rays to pass through, at least one of the lens elements having a material capable of absorbing visible light and having transmittance being less than 2% for visible light, wherein the at least one or at least another one of the lens elements has negative refracting power;
a filter disposed between the lens elements and the image side and having transmittance less than 1% for light having a wavelength band greater than 1050 nm; and
a plurality of layer stacks respectively stacked on the object-side surfaces and the image-side surfaces of the lens elements, each of the layer stacks comprising at least one high index material layer and at least one low index material layer stacked together so that for light having a wavelength band from 800 nm to 1000 nm, transmittance of the light passing through the optical lens assembly is greater than 95% throughout the entire wavelength band from 800 nm to 1000 nm, wherein an index of refraction of the high index material layer is greater than an index of refraction of the low index material layer.

13. The optical lens assembly according to claim 12, wherein each of the layer stacks comprises two high index material layers and two low index material layers stacked alternately.

14. The optical lens assembly according to claim 13, wherein for each of the layer stacks, a high index material layer closest to a corresponding lens element among the high index material layers is disposed between the corresponding lens element and a low index material layer closest to the corresponding lens element among the low index material layers.

15. The optical lens assembly according to claim 14, wherein for each of the layer stacks, the index of refraction of the high index material layers is greater than the index of refraction of the corresponding lens element.

16. The optical lens assembly according to claim 13, wherein the high index material layers are made of titanium dioxide, and the low index material layers are made of silicon dioxide.

17. The optical lens assembly according to claim 12, wherein the at least one high index material layer is made of titanium dioxide, and the at least one low index material layer is made of silicon dioxide.

18. The optical lens assembly according to claim 12, wherein an index of refraction of the at least one high index material layer ranges from 2.4 to 2.7, and an index of refraction of the at least one low index material layer ranges from 1.5 to 1.6.

19. The optical lens assembly according to claim 12, wherein a lens element closest to the object side among the lens elements is made of a material capable of absorbing visible light.

\* \* \* \* \*